Patented June 28, 1949

2,474,670

UNITED STATES PATENT OFFICE 2,474,670

PRODUCTION OF PROPYLENE POLYMERS

Arthur B. Hersberger, Drexel Hill, and Randall G. Heiligmann, Yeadon, Pa., assignors to The Atlantic Refining Company, Philadelphia, Pa., a corporation of Pennsylvania No Drawing. Application March 6, 1946, Serial No. 652,492

3 Claims. (Cl. 260—94)

The present invention relates to the polymerization of propylene, and more particularly to the low temperature catalytic polymerization of propylene to form polymers having an average molecular weight above 1500.

It has been proposed heretofore to prepare propylene polymers of the nature of lubricating oil by catalytically polymerizing propylene with Friedel-Crafts catalyst at temperatures above −10° C. It has also been proposed to polymerize various olefins and olefin mixtures such as isobutylene, butadiene, styrene, and the like with Friedel-Crafts catalysts at low temperatures in the presence of solvents or diluents such as the lower alkyl chlorides, liquefied normally gaseous hydrocarbons, carbon disulfide, and the like. However, in carrying out the low temperature polymerization of propylene in the presence of such solvents, we have found that in most cases the yield of polymers is low, particularly in the molecular weight range above 1500.

We have further found that such difficulty may be overcome and that high yields of propylene polymers having an average molecular weight above 1500 may be obtained by carrying out the polymerization at low temperature in the presence of a solvent comprising a cycloparaffin hydrocarbon or mixture of such hydrocarbons which are liquid or may be liquefied at the polymerization temperature. Such solvents are exemplified by cyclopropane, cyclobutane, methyl cyclobutane, cyclopentane, cyclohexane, methyl cyclohexane, dimethyl cyclohexane, and cycloheptane.

In carrying out the polymerization, the propylene, if not liquid, may be liquefied by compression and cooling, or by cooling alone, and is then admixed with a suitable quantity of a cycloparaffin, the ratio of cycloparaffin to propylene being at least 1:1 by volume. In general, a ratio between 1:1 and 10:1 may be used, and 1:1 to 4:1 is usually sufficient. If desired, the solvent may first be cooled to a temperature below the polymerization temperature, and gaseous propylene then introduced into the cold solvent in the proper amount, the propylene being absorbed or liquefied at the low temperature. Or, liquefied propylene and liquid cycloparaffin may be separately cooled and then mixed, or may be mixed and then cooled. In any event the temperature of the mixture is adjusted to that level desired for the polymerization reaction, i. e., below −20° C., and preferably between −50° C. and −100° C. The cooling may be accomplished by indirect refrigeration, by autogenous vaporization of a portion of the cycloparaffin, if normally gaseous, or of a portion of the propylene, or of both. Alternatively, the cycloparaffin and propylene may be cooled by the direct addition of solid carbon dioxide or liquid nitrogen, followed by vaporization of such refrigerant. The cooled mixture of cycloparaffin and propylene, contained in a suitable reaction vessel which is preferably jacketed for temperature control, is then subjected to polymerization by means of a Friedel-Crafts catalyst. Such catalysts are exemplified by the aluminum halides, particularly anhydrous $AlCl_3$, the active metal halides such as iron, zinc, or tin chloride, and the halides such as the chlorides or fluorides of boron and titanium. If the catalysts are normally solid, they are preferably dissolved or dispersed in a suitable solvent, such as a lower alkyl halide, and particularly ethyl chloride, prior to introduction into the polymerization reactants. Alkyl halides other than ethyl chloride may be used, and are represented by methyl chloride or bromide, propyl or isopropyl chloride or bromide, and the like. Catalysts comprises an ethyl chloride solution containing from 1% to 4% of anhydrous $AlCl_3$ may be used with excellent results. Normally, about 1 volume of catalyst solution per 100 volumes of liquid propylene is reduced to effect the desired reaction. However, the amount of catalyst will vary with the activity of the catalyst and the degree of polymerization desired. The catalyst solution is preferably sprayed into the cycloparaffin solution of propylene, and the mixture is vigorously agitated during the polymerization reaction in order to insure intimate contact between the catalyst and the olefin reactant. If the reactant mixture is volatile at the polymerization temperature, sufficient pressure may be applied to maintain the cycloparaffin and propylene in the liquid state. The polymerization reaction is usually rapid, and the polymers may be recovered by treating the reaction mixture with a lower aliphatic alcohol, i. e., methanol, ethanol, or propanol, to destroy the activity of any unused catalyst. The entire mixture may then be warmed to room temperature and washed with water, if desired, to remove alcohol and catalyst residues. The resulting solution of propylene polymer in cycloparaffin may be distilled under reduced pressure to remove the cycloparaffin, and the distillation residue may be fractionated to separate polymer fractions of different molecular weights, if desired. In carrying out the polymerization, a mixture of propylene polymers of varying consistency is obtained. At −20 C. a substantial amount of oily polymers are formed, together with more viscous or resinous polymers.

At —50° C. the quantity of oil polymers is much less, and the average molecular weight of the polymer is above 1500. At still lower temperature, i. e., —80° C., the polymer is resinous and semi-solid, and of a molecular weight considerably greater than 1500.

The present invention may be further illustrated by the following examples, which, however, are not to be construed as limiting the scope thereof.

A reaction vessel provided with a mechanical stirrer was partially filled with the cycloparaffin which had been precooled to a few degrees below the temperature at which the polymerization was to be carried out. Propylene gas was passed at atmospheric pressure through a cooling coil and cooled to the polymerization temperature. The cold, liquefied propylene was then mixed in the desired proportion with the cold cycloparaffin in the reaction vessel. The mixture was then vigorously stirred and a precooled solution of catalyst (1% anhydrous $AlCl_3$ in ethyl chloride) was sprayed from a nozzle onto the surface of the contents of the vessel, and thoroughly incorporated in the contents. The amount of $AlCl_3$ solution used was 1 volume per 10 volumes of liquefied propylene. Under the influence of the catalyst, polymerization of the propylene was effected, the vessel being refrigerated to remove the heat liberated by the reaction. Upon completion of the reaction, which was evidenced by the cessation of heat evolution, a quantity of precooled ethyl alcohol was added to the reaction mixture to destroy residual catalytic activity. The mixture was then warmed to room temperature, traces of catalyst residue were removed, and the alcohol and cycloparaffin distilled from the polymer at reduced pressure. The results obtained using various cycloparaffins and different polymerization temperatures are given in the following table.

| Reactant | Ratio cycloparaffin to propylene | Reaction Temp., °C. | Catalyst | Per cent yield polymer |
|---|---|---|---|---|
| Propylene in methyl cyclopropane | 1.2 to 1 | —65 to —73 | 1% $AlCl_3$ in $C_2H_5Cl$ | 85 |
| Propylene in methyl cyclopentane | 1.2 to 1 | —64 to —65 | ----do---- | 79 |
| Propylene in methyl cyclohexane | 1.2 to 1 | —62 to —72 | ----do---- | 95 |
| Do | 1.2 to 1 | —56 to —65 | ----do---- | 85 |
| Do | 1.2 to 1 | —51 to —55 | ----do---- | 50 |

The polymers produced in accordance with this invention range from viscous, resinous oils to solids, and may be used in insulating oils and compositions, adhesives, lubricants, grease bases, and rust preventives.

We claim:

1. A method for polymerizing propylene, which comprises cooling a solution of propylene in a cycloparaffin to a temperature between —20° C. and —100° C., the ratio of cycloparaffin to propylene being between 1:1 and 10:1 and the cycloparaffin being liquid at the temperature aforesaid, intimately contacting the propylene-cycloparaffin solution at —20° C. to —100° C. with a solution of 1% to 4% of $AlCl_3$ in an alkyl halide containing not more than 3 carbon atoms for sufficient time to effect polymerization, the quantity of $AlCl_3$ solution being about 10% by volume of the propylene and separating the propylene polymer from the polymerization mixture.

2. A method for polymerizing propylene, which comprises cooling a solution of propylene in a cycloparaffin to a temperature between —20° C. and —100° C., the ratio of cycloparaffin to propylene being between 1:1 and 10:1 and the cycloparaffin being liquid at the temperature aforesaid, intimately contacting the propylene-cycloparaffin solution at —20° C. to —100° C. with a solution of 1% to 4% of $AlCl_3$ in ethyl chloride for sufficient time to effect polymerization, the quantity of $AlCl_3$ solution being about 10% by volume of the propylene, and separating the propylene polymer from the polymerization mixture.

3. A method for polymerizing propylene, which comprises cooling a solution of propylene in methyl cyclohexane to a temperature between —20° C. and —100° C., the ratio of methyl cyclohexane to propylene being between 1:1 and 10:1, intimately contacting the propylene-methyl cyclohexane solution at —20° C. to —100° C. with a solution of 1% to 4% of $AlCl_3$ in ethyl chloride for sufficient time to effect polymerization, the quantity of $AlCl_3$ solution being about 10% by volume of the propylene, and separating the propylene polymer from the polymerization mixture.

ARTHUR B. HERSBERGER.
RANDALL G. HEILIGMANN.

REFERENCES CITED

The following references are of record in the file of this patent:

UNITED STATES PATENTS

| Number | Name | Date |
|---|---|---|
| 1,822,358 | Michel | Sept. 8, 1931 |
| 2,387,784 | Thomas | Oct. 30, 1945 |

Certificate of Correction

Patent No. 2,474,670 June 28, 1949

ARTHUR B. HERSBERGER ET AL.

It is hereby certified that errors appear in the printed specification of the above numbered patent requiring correction as follows:

Column 2, line 26, for "100 volumes" read *10 volumes*; line 53, for "—20 C." read *—20° C.*;

and that the said Letters Patent should be read with these corrections therein that the same may conform to the record of the case in the Patent Office.

Signed and sealed this 13th day of December, A. D. 1949.

[SEAL]

THOMAS F. MURPHY,
*Assistant Commissioner of Patents.*